W. RUNGE.
FRICTION CLUTCH.
APPLICATION FILED OCT. 27, 1908.
946,155.
Patented Jan. 11, 1910.
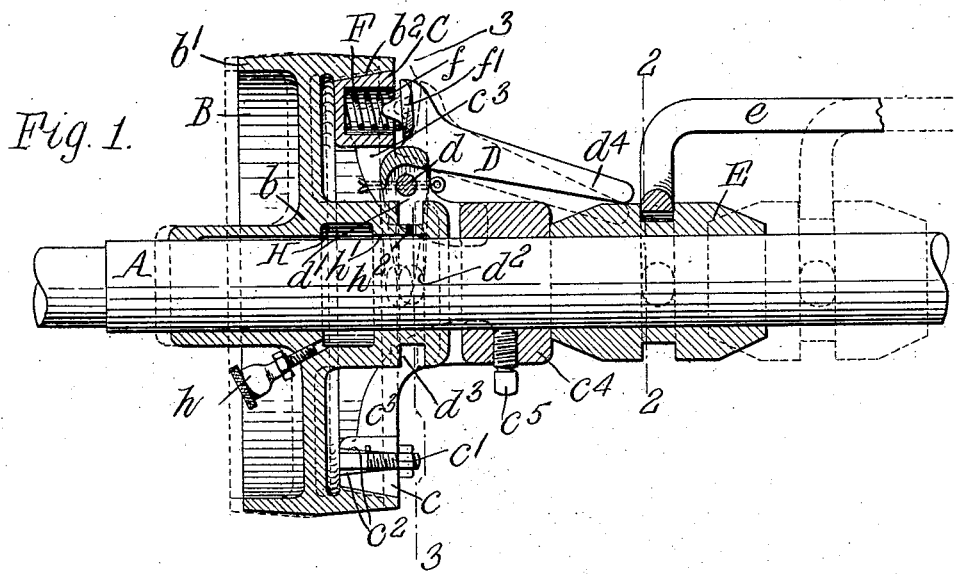
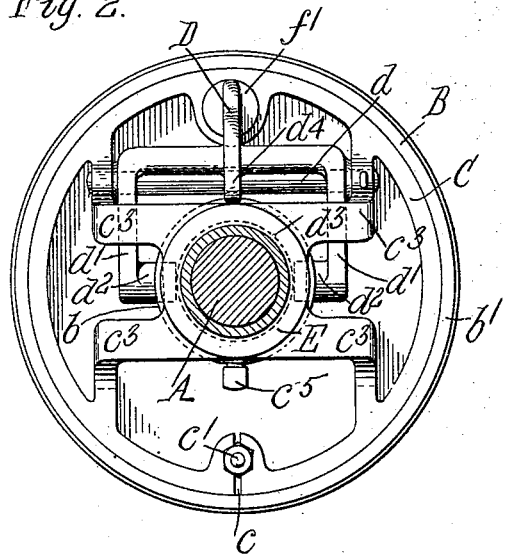
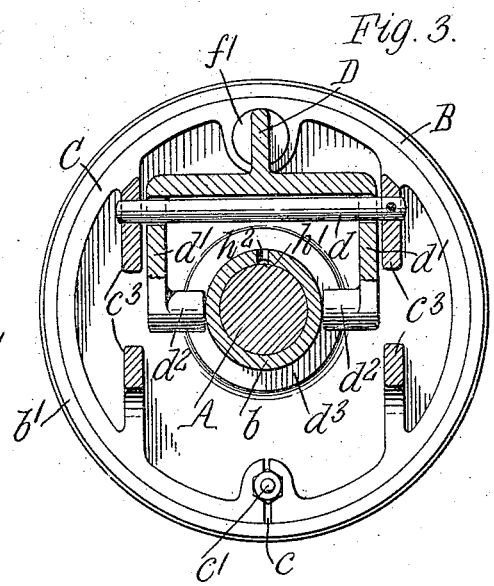
Witnesses:
E. A. Volk.
N. T. Dimond
Inventor.
William Runge.
By Wilhelm, Parker & Hand,
Attorneys.

UNITED STATES PATENT OFFICE.

WILLIAM RUNGE, OF SENECA FALLS, NEW YORK, ASSIGNOR TO THE SENECA FALLS MANUFACTURING COMPANY, OF SENECA FALLS, NEW YORK.

FRICTION-CLUTCH.

946,155.      Specification of Letters Patent.      Patented Jan. 11, 1910.

Application filed October 27, 1908. Serial No. 459,703.

*To all whom it may concern:*

Be it known that I, WILLIAM RUNGE, a citizen of the United States, residing at Seneca Falls, in the county of Seneca and State of New York, have invented a new and useful Improvement in Friction-Clutches, of which the following is a specification.

This invention relates more particularly to improvements in friction clutches which are adapted for releasably securing pulleys or wheels to the shafts upon which they are mounted so that the pulleys and shafts can be made to turn together or independently of each other, as may be desired.

The object of this invention is to provide a clutch which will be simple and compact in construction, positive in operation, and in which spring-operated means are employed for moving one member of the clutch out of engagement with the other member, which are so constructed that when the loose clutch member has been moved a sufficient distance to be freed from the other member, it will be held from lateral movement in such released position and further action of the spring upon the loose clutch member will be prevented, thereby greatly reducing the friction between these parts and thus permitting the loose member to turn more freely.

In the accompanying drawings: Figure 1 is a sectional elevation of a friction clutch embodying the invention, showing in solid lines the position of the parts when in frictional engagement and in dotted lines their position when released. Fig. 2 is a transverse sectional elevation thereof in line 2—2, Fig. 1. Fig. 2 is a similar elevation in line 3—3, Fig. 1.

Like reference characters refer to like parts in the several figures.

A represents a shaft and B a pulley or wheel loosely mounted thereon having the usual hub $b$ and rim $b'$ provided on its inner side with a beveled friction face $b^2$. This pulley constitutes the loose member of the clutch.

Supported on the shaft beside the pulley is the fixed clutch member having a friction clutch ring C provided with a beveled outer face adapted to engage the inner face $b^2$ of the pulley. This ring is preferably split at $c$ where it is provided with a suitable bolt $c'$ having wedge faces $c^2$ which engage the opposite ends of the ring. By adjusting this bolt the ends of the ring can be forced apart to expand the same for taking up the wear.

Supporting arms $c^3$ connect the friction ring C with a hub $c^4$ secured to the shaft A by a set screw $c^5$, or in any other desirable manner. The supporting arms $c^3$ are preferably arranged in pairs on opposite sides of the hub and between one pair of these arms is fulcrumed, on a shaft $d$ or in any other suitable way, a bell crank shifting lever D which is provided with inwardly-extending forked arms $d'$ which straddle the hub of the pulley and have inturned ends $d'$ located at diametrically opposite sides of the hub $b$ which enter an annular groove $d^3$ in this hub. The forked arms $d'$ are adapted to be moved lengthwise of the axis of the hub for shifting the pulley and as these arms engage the hub on opposite sides of its axis, the pull exerted by them upon the pulley is directly in the line of movement of the pulley along the shaft instead of at an angle thereto. This construction is preferable as it permits the employment of a single shifting lever and prevents any side strain or binding between the pulley and its shaft during the shifting operation, but if desired, the forked arms may be dispensed with and two or more levers having single arms may be employed for engaging the hub of the pulley on different sides thereof for shifting the pulley. The lever D also has an actuating arm $d^4$ which is adapted to be engaged by a conical sleeve E which is slidably mounted upon the shaft A and is moved into and out of engagement with the arm $d^4$ by a shipping device $e$ of any suitable construction.

When the sleeve E is moved into engagement with the arm $d^4$ of the shifting lever it swings this arm outwardly from the shaft and this actuates the other arms $d'$ of the lever to move the pulley B which is engaged by these arms along the shaft into engagement with the friction clutch ring C. When the sleeve E is moved out of engagement with the lever arm $d^4$, the lever D is free to return to its original position and allow the pulley to be moved along the shaft out of engagement with the friction ring.

For facilitating the ready and positive release and separation of the pulley from the friction ring, a suitable spring is arranged between the lever and the clutch member upon which the lever is mounted, which tends to hold the lever normally in its released position and causes it to return to this position from its clutching position when the sleeve E is moved in the releasing direction. This spring may be of any suitable construction and may be located at any convenient point between the lever and its clutch member. In the construction shown, a compression spring F is employed which is located in a pocket $f$ in the friction ring C of the clutch and engages a head $f'$ on the lever D by which it is compressed when the lever is moved into its clutching position. When the sleeve E is shifted to release the lever the spring forces the latter back to its released position and the arms $d'$ of the lever slide the pulley along the shaft out of engagement with the friction ring. The extent of this releasing movement of the lever under the action of the spring is limited by the hub $c^4$ against which the arm $d^4$ of the lever strikes and which acts as a stop or rest for the arm $d^4$ when the lever has been moved a sufficient distance to release the pulley from the friction clutch. Further movement of the lever is thus prevented and the pulley is held by the lever arms $d'$ in its released position, these arms traveling freely in the groove $d^3$ in the hub of the pulley but preventing lateral movement thereof in either direction. It will thus be seen that the action of the spring is positive, causing an immediate return of the lever from its clutching to its released position, and that this action of the spring is only communicated through the lever to the pulley during such return movement, the pulley in its released position being free from any spring pressure, thereby greatly reducing the friction between the clutch members.

For lubricating the groove or slot $d^3$ in the hub $b$ in which the inturned ends $d^2$ of the lever arms $d'$ engage, the hub $b$ of the pulley is provided with a suitable oil chamber H surrounding the shaft A to which oil is supplied from an oil cup $h$ on the hub $b$. From the chamber H an oil passage-way $h'$ extends along the inner side of the hub and communicates at its end through a hole $h^2$ in the hub with the groove $d^3$, thereby furnishing a constant supply of oil to this groove. Thus a single device supplies the lubricant to both the shaft opening of the pulley and the groove $d^3$.

The invention is not restricted to the described way in which the fixed and loose clutch members are mounted or connected to driving and driven parts, and either member of the clutch can constitute the loose or driven member, as may be desired.

I claim as my invention:

1. The combination of a shaft, two friction clutch members mounted thereon, one of said members being movable relatively to the other longitudinally of said shaft, a shifting lever fulcrumed on one of said members and engaging the other member for positively moving said other member both into and out of engagement with the said member upon which said lever is fulcrumed, means for operating said lever to move said clutch members into engagement with each other, and a spring between said shifting lever and the clutch member upon which it is fulcrumed for moving said lever to shift said clutch members out of engagement with each other, substantially as set forth.

2. The combination of a shaft, two friction clutch members mounted thereon, one of said members being movable relatively to the other longitudinally of said shaft, a shifting lever fulcrumed on one of said members and engaging the other member for positively moving said other member both into and out of engagement with the said member upon which said lever is fulcrumed, means for operating said lever to move said clutch members into engagement with each other, and a spring between said shifting lever and the clutch member upon which it is fulcrumed for moving said lever to shift said clutch members out of engagement with each other, said shifting lever being arranged to strike a part on the member upon which it is fulcrumed for limiting the shifting movement of said lever under the action of said spring to relieve said movable member from the pressure of said spring when in its disengaged position, substantially as set forth.

3. The combination of a shaft, a friction clutch member loosely mounted thereon, a second friction clutch member secured to said shaft to rotate therewith, one of said members being movable relatively to the other member longitudinally of said shaft, a shifting lever fulcrumed on one of said members and engaging the other member for positively moving said other member both into and out of engagement with the said member upon which said lever is fulcrumed, means for operating said lever to move said longitudinally movable clutch member along said shaft into engagement with the other clutch member, and a spring between said lever and the clutch member upon which it is fulcrumed for moving said lever to shift said longitudinally movable clutch member out of engagement with said other clutch member, substantially as set forth.

4. The combination of a shaft, a pulley loosely mounted thereon and movable longitudinally thereof, a friction clutch member secured to said shaft and adapted to engage said pulley, a shifting lever fulcrumed on said friction clutch member and engaging said pulley for positively moving said pulley into and out of engagement with said clutch member, means for operating said lever for moving said pulley into engagement with said friction clutch member, and a spring between said lever and said friction clutch member for moving said lever to shift said pulley along said shaft out of engagement with said friction clutch member, substantially as set forth.

5. The combination of a shaft, a pulley loosely mounted thereon and movable longitudinally thereof, a friction clutch member secured to said shaft and adapted to engage said pulley, a shifting lever fulcrumed on said friction clutch member and engaging said pulley for positively moving said pulley into and out of engagement with said clutch member, means for operating said lever for moving said pulley into engagement with said friction clutch member, and a spring between said lever and said friction clutch member for moving said lever to shift said pulley along said shaft out of engagement with said friction clutch member, said shifting lever being arranged to strike a part on said friction clutch member for limiting the shifting movement of said lever under the action of said spring to relieve said pulley from the pressure of said spring after it has been shifted out of engagement with said friction clutch member, substantially as set forth.

Witness my hand in the presence of two subscribing witnesses.

WILLIAM RUNGE.

Witnesses:
 J. C. RUTHERFORD,
 J. C. DAVIS.